(12) United States Patent
Severtson

(10) Patent No.: US 7,055,000 B1
(45) Date of Patent: May 30, 2006

(54) DISK DRIVE EMPLOYING ENHANCED INSTRUCTION CACHE MANAGEMENT TO FACILITATE NON-SEQUENTIAL IMMEDIATE OPERANDS

(75) Inventor: Eric L. Severtson, Trabuco Canyon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 488 days.

(21) Appl. No.: 10/651,412

(22) Filed: Aug. 29, 2003

(51) Int. Cl.
*G06F 12/12* (2006.01)

(52) U.S. Cl. .................. 711/133; 711/113; 711/125

(58) Field of Classification Search ............... None
See application file for complete search history.

(56) References Cited

U.S. PATENT DOCUMENTS

| | | | |
|---|---|---|---|
| 4,933,837 A | | 6/1990 | Freidin |
| 5,148,432 A | * | 9/1992 | Gordon et al. ................. 714/7 |
| 5,465,343 A | * | 11/1995 | Henson et al. ............... 711/112 |
| 5,701,435 A | | 12/1997 | Chi |
| 6,336,154 B1 | | 1/2002 | McCarthy et al. |
| 6,392,935 B1 | * | 5/2002 | Mulholland ............ 365/189.05 |
| 6,430,660 B1 | * | 8/2002 | Kemp et al. ................. 711/153 |

\* cited by examiner

*Primary Examiner*—Denise Tran
(74) *Attorney, Agent, or Firm*—Howard H. Sheerin, Esq.

(57) ABSTRACT

A disk drive is disclosed for executing a program comprising a plurality of instructions. The disk drive comprises a primary memory for storing the instructions, and a cache memory for caching the instructions. The cache management is enhanced by not re-filling the cache due to accessing a non-sequential immediate operand.

12 Claims, 4 Drawing Sheets

```
strcopy
0x00010000:      e4d12001      LDRB    r2,[r1],#1
0x00010004:      e4c02001      STRB    r2,[r0],#1
0x00010008:      e3520000      CMP     r2,#0
0x0001000c:      1afffffe      BNE     strcopy
0x00010010:      e12fff1e      BX      r14
```

FIG. 3A

```
0x00010000:      e2800005      ADD     r0,r0,#5
0x00010004:      e3a02013      MOV     r2,#0x13
0x00010008:      e0000092      MUL     r0,r2,r0
0x0001000c:      e59f2008      LDR     r2,[pc,#8]
0x00010010:      e0010192      MUL     r1,r2,r1
0x00010014:      e0400001      SUB     r0,r0,r1
0x00010018:      e12fff1e      BX      r14

0x0001001c:      075bcd15      DCD     123456789
```

FIG. 3B

DISK DRIVE EMPLOYING ENHANCED INSTRUCTION CACHE MANAGEMENT TO FACILITATE NON-SEQUENTIAL IMMEDIATE OPERANDS

BACKGROUND OF THE INVENTION

1. Field of the Invention

The present invention relates to disk drives. In particular, the present invention relates to a disk drive employing enhanced instruction cache management to facilitate non-sequential immediate operands.

2. Description of the Prior Art

A disk drive typically comprises a microprocessor executing instructions of a program 11 stored in a memory, wherein a memory controller reads the instructions from the memory and provides the instructions to the microprocessor. The memory is typically implemented as a separate chip, such as a dynamic random access memory (DRAM), which provides substantial storage capacity at minimal cost. Stand alone memory chips, such as DRAM, are typically "burst access" devices meaning they operate at optimal speed if blocks of memory are accessed sequentially. This is due to the setup and arbitration time required for the first access, after which subsequent sequential access times are significantly shorter.

If a non-sequential instruction is encountered during the execution of a program, the processing speed is reduced due to the latency in accessing the first instruction in the following sequence of instructions. For example, if a branch instruction is encountered there is a delay associated with accessing the first instruction following the branch. Prior art techniques have employed a cache memory (e.g., a static random access memory (SRAM)) integrated into a chip with the microprocessor for caching the sequence of instructions associated with a branch instruction, such as a branch instruction at the end of a loop. The cache memory has no setup or arbitration delay so that the cached instructions within the loop can be executed immediately, thereby avoiding the delay associated with the external memory. When the loop terminates, a "cache miss" occurs causing the cache memory to be flushed and refilled with the instructions following the loop.

Certain microprocessors (e.g., certain ARM microprocessors) employ a fixed length instruction set wherein an immediate operand (a constant) may be implemented as a non-sequential instruction. If a non-sequential immediate operand results in a cache miss causing the instruction cache to be flushed, processing performance will degrade. The memory controller will fill the instruction cache with instructions following the immediate operand which are not the next instructions to be executed. This results in yet another cache miss further increasing the processing delay associated with flushing and refilling the instruction cache.

There is, therefore, a need to improve processing speed in a computer system that implements an immediate operand as a non-sequential instruction.

SUMMARY OF THE INVENTION

The present invention may be regarded as a disk drive for executing a program comprising a plurality of instructions. The disk drive comprises a disk, a head actuated over the disk, a primary memory for storing a plurality of the instructions, a cache memory for caching a subset of the instructions stored in the primary memory, a microprocessor for executing the instructions, and a memory controller for transferring the instructions to the microprocessor. The memory controller transfers an instruction from the cache memory to the microprocessor if the instruction is stored in the cache memory, and the memory controller transfers the instruction from the primary memory to the microprocessor if the instruction is not stored in the cache memory. The memory controller replaces at least one instruction stored in the cache memory with an instruction stored in the primary memory if a first and a second instruction are transferred to the microprocessor where the first and second instructions have sequential addresses and the second instruction is transferred from the primary memory.

In one embodiment, the first instruction is transferred from the cache memory, and in another embodiment, the first instruction is transferred from the primary memory.

In one embodiment, the microprocessor comprises a register and the instructions comprise a load instruction for loading a non-sequential immediate operand into the register. The cache memory stores the load instruction, a plurality of instructions preceding the load instruction, and a plurality of instructions following the load instruction exclusive of the non-sequential immediate operand. When the microprocessor executes the load instruction, the memory controller transfers the non-sequential immediate operand from the primary memory to the microprocessor, and the memory controller does not replace an instruction in the cache memory with an instruction from the primary memory.

In another embodiment, the microprocessor comprises a program counter for tracking an execution sequence of the instructions, and the instructions comprise a branch instruction for loading an address into the program counter. After the microprocessor executes the branch instruction, the memory controller transfers a sequential instruction from the primary memory to the microprocessor, and the memory controller replaces at least one instruction in the cache memory with an instruction from the primary memory.

The present invention may also be regarded as a method of executing a program in a disk drive, the program comprising a plurality of instructions. The disk drive comprising a disk, a head actuated over the disk, a primary memory for storing a plurality of the instructions, a cache memory for caching a subset of the instructions stored in the primary memory, and a microprocessor for executing the instructions. If an instruction is stored in the cache memory, it is transferred from the cache memory to the microprocessor, otherwise it is transferred from the primary memory to the microprocessor. At least one instruction stored in the cache memory is replaced with an instruction stored in the primary memory if a first and second instructions are transferred to the microprocessor where the first and second instructions have sequential addresses and the second instruction is transferred from the primary memory.

BRIEF DESCRIPTION OF THE DRAWINGS

FIG. 3A is an assembly code segment illustrating a branch instruction at the end of a loop, wherein the instruction executed after the branch is non-sequential.

FIG. 3B is an assembly code segment illustrating a non-sequential immediate operand instruction.

DESCRIPTION OF THE PREFERRED EMBODIMENTS

Figure 1:
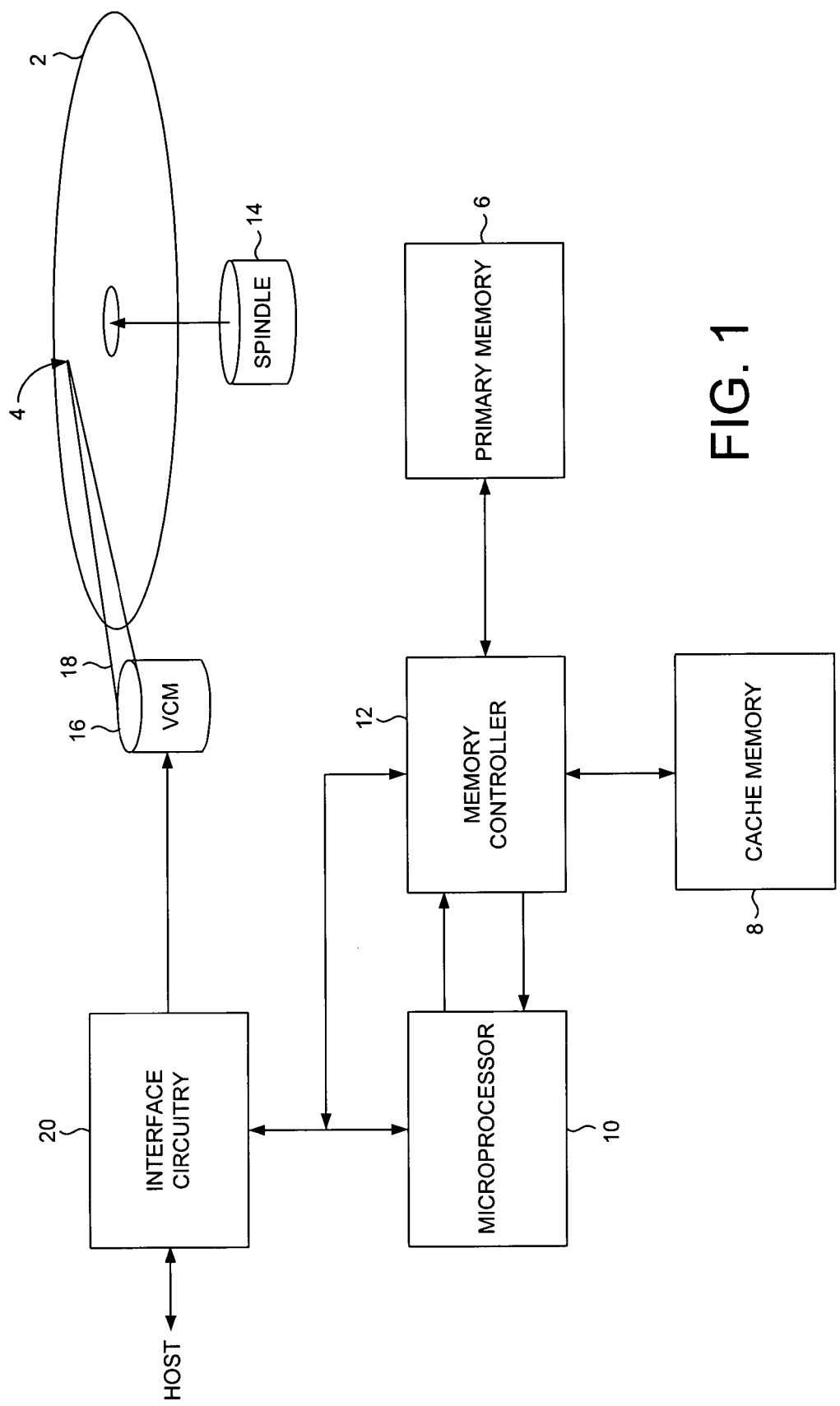
FIG. 1 shows a disk drive according to an embodiment of the present invention comprising a primary memory, a cache memory, and a microprocessor for executing instructions stored in the primary memory of the cache memory.

FIG. 1 shows a disk drive for executing a program comprising a plurality of instructions according to an embodiment of the present invention. The disk drive comprises a disk 2, a head 4 actuated over the disk 2, a primary memory 6 for storing a plurality of the instructions, a cache memory 8 for caching a subset of the instructions stored in the primary memory 6, a microprocessor 10 for executing the instructions, and a memory controller 12 for transferring the instructions to the microprocessor 10. The memory controller 12 transfers an instruction from the cache memory 8 to the microprocessor 10 if the instruction is stored in the cache memory 8, and the memory controller 12 transfers the instruction from the primary memory 6 to the microprocessor 10 if the instruction is not stored in the cache memory 8. The memory controller 12 replaces at least one instruction stored in the cache memory 8 with an instruction stored in the primary memory 6 if a first and a second instruction are transferred to the microprocessor 10 where the first and second instructions have sequential addresses and the second instruction is transferred from the primary memory 6. In one embodiment, the first instruction is transferred from the cache memory 8, and in another embodiment, the first instruction is transferred from the primary memory 6.

The disk drive in FIG. 1 further comprises a spindle motor 14 for rotating the disk 2 about a center axis, and voice coil motor (VCM) 16 for rotating an actuator arm 18 about a pivot in order to actuate the head 4 radially over the disk 2. Interface circuitry 20 implements various functions for interfacing with the disk 2 (e.g., read channel and error correction code (ECC) processing) as well as various functions for interfacing with a host (e.g., direct memory access (DMA) circuitry for transferring user data between the host and the primary memory 6 during read and write operations).

Figure 2:
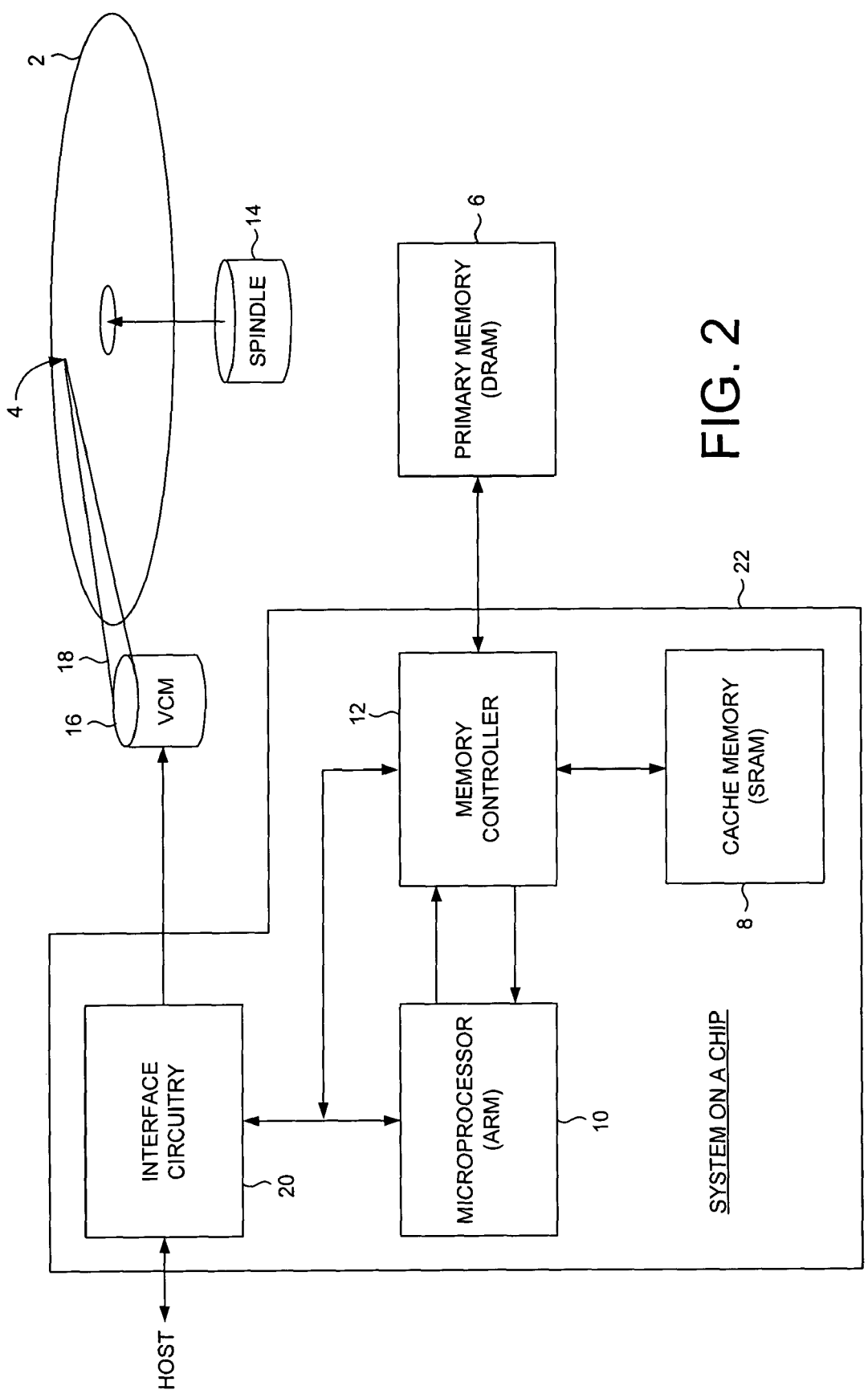
FIG. 2 shows a disk drive according to an embodiment of the present invention wherein the primary memory comprises a DRAM, the cache memory comprises a SRAM, and the microprocessor comprises an ARM microprocessor.

Any suitable memory may be used to implement the primary memory 6 and cache memory 8, and any suitable microprocessor 10 may be employed in the embodiments of the present invention. FIG. 2 shows an embodiment of the present invention wherein the primary memory 6 comprises a dynamic random access memory (DRAM), the cache memory 8 comprises a static random access memory (SRAM), and the microprocessor 10 comprises an ARM microprocessor implementing a fixed length instruction set which means that, as described below with reference to FIG. 3B, an immediate operand may be represented as a non-sequential instruction. Also in the embodiment of FIG. 2, the interface circuitry 20, microprocessor 10, memory controller 12, and cache memory 8 are integrated into a "system on a chip" 22, and the primary memory (DRAM) 6 is implemented as one or more external chips. During write operations, the interface circuitry 20 receives user data from the host and transfers the user data (via DMA circuitry) to the primary memory 6 through the memory controller 12. The user data is staged in the primary memory 6 and eventually written to the disk 2. During read operations, the interface circuitry 20 reads the user data from the disk 2 and transfers the user data (via DMA circuitry) to the primary memory 6 through the memory controller 12. The user data stored in the primary memory 6 is eventually transferred to the host (via DMA circuitry).

As described above, the cache memory (SRAM) 8 improves the processing performance of the microprocessor 10 since it has a much faster access time as compared to the primary memory (DRAM) 6. In addition, since instructions stored in the cache memory 8 can be transferred immediately to the microprocessor 10, the cache memory 8 improves processing performance by avoiding the arbitration delay when the primary memory 6 is accessed by both the microprocessor 10 fetching instructions as well as the interface circuitry 20 storing/retrieving user data.

The cache memory 8 also improves processing performance by caching instructions associated with branch instructions, particularly when a subset of the instructions are re-executed during a loop. This is illustrated in FIG. 3A which shows an assembly code segment which copies a zero-terminated string at [r1] to the buffer at [r0] (where r0 and r1 are registers in the microprocessor 10). The loop comprises the instructions at address 0x00010000 through 0x0001000c with a branch instruction BNE at the end of the loop at address 0x0001000c. The microprocessor 10 comprises a program counter for tracking an execution sequence of the instructions. When the branch instruction BNE is executed, the first address in the loop (0x00010000) is loaded into the program counter so that the instructions in the loop are re-executed. If the loop instructions are cached in the cache memory 8, they can be retrieved repeatedly by the memory controller 12 and transferred to the microprocessor 10 without having to access the primary memory 6.

If an instruction is not stored in the cache memory 8, a "cache miss" occurs and the memory controller 12 must access the primary memory 6 to transfer the instruction. A typical prior art cache management policy would flush and refill the cache memory 8 whenever a cache miss occurs. This is illustrated in FIG. 3A wherein following the loop is a branch instruction BX r14 at address 0x00010010 which is a return from function instruction. After returning from the function, the next instruction executed is non-sequential causing a cache miss to occur wherein the memory controller 12 will flush and refill the cache memory 8 with a subset of instructions from the primary memory 6. However, a policy of flushing/refilling the cache memory 8 whenever a cache miss occurs will actually degrade processing performance if an immediate operand is implemented as a non-sequential instruction.

This is illustrated in FIG. 3B which shows an assembly code segment implementing the following C function:

```
int fn1(int a, int b)
{
  return ((a+5)*19)-(b*123456789);
}
```

The instruction LDR r2,[pc,#8] at address 0x0001000c loads the immediate operand 123456789 located at address 0x0001001c into register r2 (i.e., the instruction at address 0x0001001c is a non-sequential immediate operand). Assume for this example that the instructions at address 0x00010000 through 0x00010018 are cached in the cache memory 8 and that the immediate operand 123456789 at address 0x0001001c is not cached. When the microprocessor 10 executes the instruction at address 0x0001000c to load the immediate operand stored at address 0x0001001c, a cache miss will occur. If the prior art cache management policy is implemented, the memory controller 12 flushes and refills the cache memory 8 starting with the instructions at address 0x0001001c. However, the next instruction to be executed is at address 0x00010010 which was just flushed. Therefore another cache miss will occur causing the cache memory 8 to be flushed and refilled again starting with the instructions at address 0x00010010 which degrades the processing performance.

In an embodiment of the present invention, the cache management policy is enhanced by not flushing/refilling the cache memory 8 until a sequential instruction is transferred from the primary memory 6. Referring again to FIG. 3B, when the instruction LDR r2,[pc,#8] at address 0x0001000c is executed, a cache miss will occur when the non-sequential immediate operand 123456789 is accessed at address 0x0001001c. However, accessing the non-sequential immediate operand from the primary memory 6 will not cause the cache memory 8 to be flushed/refilled. Since there is a cache hit when the next instruction at address 0x00010010 is executed, the contents of the cache memory 8 is preserved and the processing performance improves.

Referring again to FIG. 3A, the first instruction executed after the return from function instruction BX r14 is a non-sequential instruction and a cache miss occurs. However, since the first instruction is a non-sequential instruction, the cache memory 8 is not flushed/refilled. The second instruction executed is a sequential instruction transferred from the primary memory 6 resulting in a cache miss that does cause the memory controller 12 to flush/refill the cache memory 8.

Figure 4:
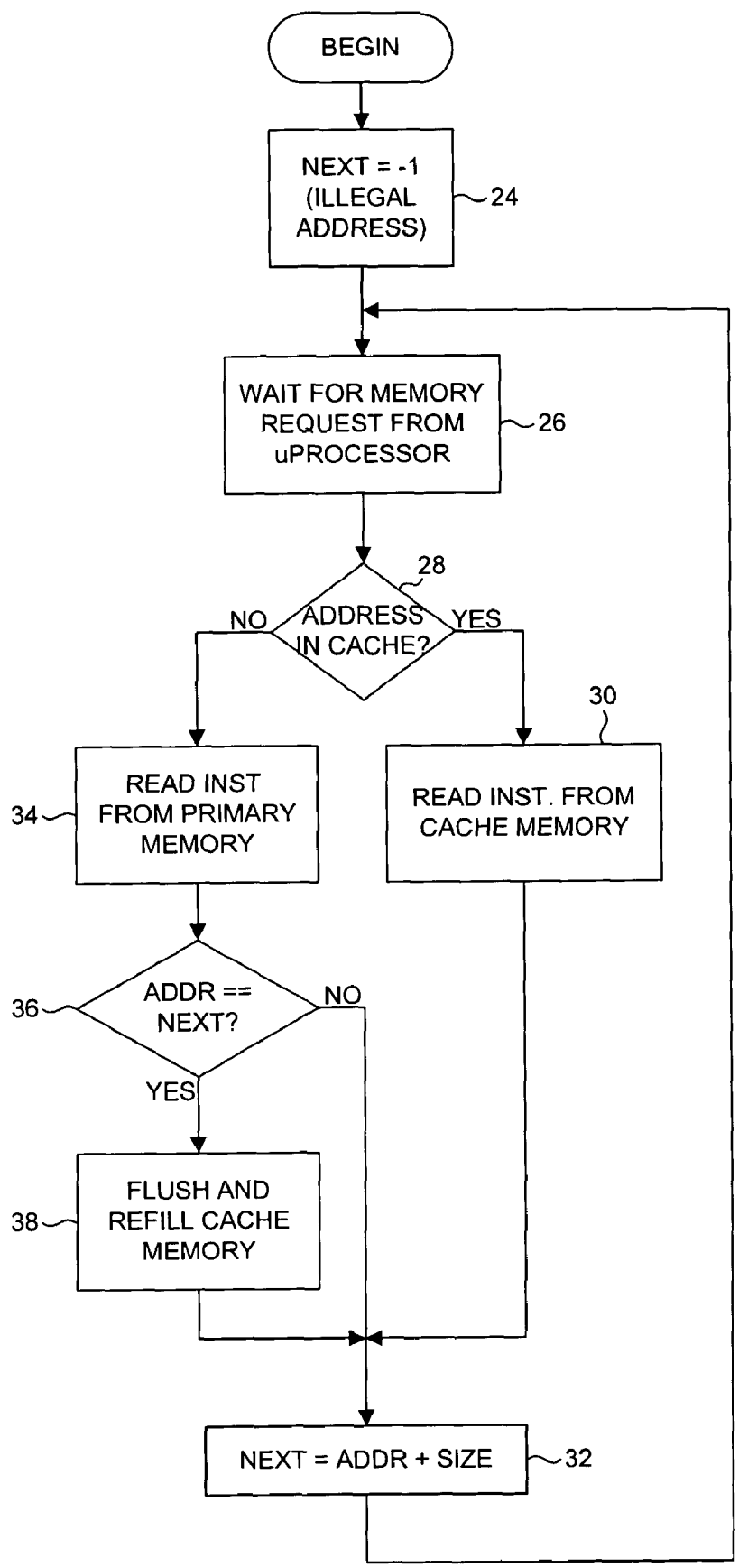
FIG. 4 is a flow diagram illustrating the steps executed by the memory controller for implementing a cache management policy according to an embodiment of the present invention.

FIG. 4 shows a flow diagram illustrating the steps executed by the memory controller 12 for implementing a cache management policy according to an embodiment of the present invention. At step 24 a variable NEXT address is initialized to −1 representing an illegal address. At step 26 the memory controller 12 waits for an access request from the microprocessor 10. If at step 28 the contents of the requested address (the instruction) is stored in the cache memory 8, then at step 30 the instruction is read from the cache memory 30 and transferred to the microprocessor 10. At step 32 the NEXT address is assigned to the next contiguous address following the requested address. If at step 28 the contents of the requested address is not stored in the cache 8, then at step 34 the instruction is read from the primary memory 6 and transferred to the microprocessor 10. If at step 36 the requested address equals the NEXT address, then a sequential instruction has been transferred from the primary memory 6 and at step 38 the memory controller 12 flushes and refills the cache memory 8 with instructions from the primary memory 6. Otherwise the cache memory 8 is not flushed and the flow continues at step 32.

I claim:

1. A disk drive for executing a program comprising a plurality of instructions, the disk drive comprising:
   (a) a disk;
   (b) a head actuated over the disk;
   (c) a primary memory for storing a plurality of the instructions;
   (d) a cache memory for caching a subset of the instructions stored in the primary memory;
   (e) a microprocessor for executing the instructions; and
   (f) a memory controller for transferring the instructions to the microprocessor, wherein:
       the memory controller transfers an instruction from the cache memory to the microprocessor if the instruction is stored in the cache memory;
       the memory controller transfers the instruction from the primary memory to the microprocessor if the instruction is not stored in the cache memory; and
       the memory controller replaces at least one instruction stored in the cache memory with an instruction stored in the primary memory if:
           the memory controller transfers a first instruction and a second instruction to the microprocessor;
           the first instruction and second instruction have sequential addresses; and
           the second instruction is transferred from the primary memory.

2. The disk drive as recited in claim 1, wherein the first instruction is transferred from the cache memory.

3. The disk drive as recited in claim 1, wherein the first instruction is transferred from the primary memory.

4. The disk drive as recited in claim 1, wherein:
   (a) the microprocessor comprises a register; and
   (b) the instructions comprise a load instruction for loading a non-sequential immediate operand into the register.

5. The disk drive as recited in claim 4, wherein:
   (a) the cache memory stores the load instruction, a plurality of instructions preceding the load instruction, and a plurality of instructions following the load instruction exclusive of the non-sequential immediate operand;
   (b) when the microprocessor executes the load instruction, the memory controller transfers the non-sequential immediate operand from the primary memory to the microprocessor; and
   (c) the memory controller does not replace an instruction in the cache memory with an instruction from the primary memory due to transferring the non-sequential immediate operand from the primary memory to the microprocessor.

6. The disk drive as recited in claim 1, wherein:
   (a) the microprocessor comprises a program counter for tracking an execution sequence of the instructions;
   (b) the instructions comprise a branch instruction for loading an address into the program counter;
   (c) after the microprocessor executes the branch instruction, the memory controller transfers a sequential instruction from the primary memory to the microprocessor; and
   (d) the memory controller replaces at least one instruction in the cache memory with an instruction from the primary memory due to transferring the sequential instruction from the primary memory to the microprocessor.

7. A method of executing a program in a disk drive, the program comprising a plurality of instructions, the disk drive comprising a disk, a head actuated over the disk, a primary memory for storing the plurality of the instructions, a cache memory for caching a subset of the instructions stored in the primary memory, and a microprocessor for executing the instructions, the method comprising the steps of:
   (a) transferring an instruction from the cache memory to the microprocessor if the instruction is stored in the cache memory;
   (b) transferring the instruction from the primary memory to the microprocessor if the instruction is not stored in the cache memory; and
   (c) replacing at least one instruction stored in the cache memory with an instruction stored in the primary memory if:
       a first instruction and a second instruction are transferred to the microprocessor;
       the first instruction and second instruction have sequential addresses; and the second instruction is transferred from the primary memory.

8. The method as recited in claim 7, wherein the first instruction is transferred from the cache memory.

9. The method as recited in claim 7, wherein the first instruction is transferred from the primary memory.

10. The method as recited in claim 7, wherein:
 (a) the microprocessor comprises a register; and
 (b) the instructions comprise a load instruction for loading a non-sequential immediate operand into the register.

11. The method as recited in claim 10, further comprising the steps of:
 (a) storing in the cache memory the load instruction, a plurality of instructions preceding the load instruction, and a plurality of instructions following the load instruction exclusive of the non-sequential immediate operand;
 (b) when the microprocessor executes the load instruction, transferring the non-sequential immediate operand from the primary memory to the microprocessor without replacing an instruction in the cache memory with an instruction from the primary memory due to the transfer.

12. The method as recited in claim 7, wherein:
 (a) the microprocessor comprises a program counter for tracking an execution sequence of the instructions;
 (b) the instructions comprise a branch instruction for loading an address into the program counter;
 (c) after the microprocessor executes the branch instruction, further comprising the step of transferring a sequential instruction from the primary memory to the microprocessor; and
 (d) replacing at least one instruction in the cache memory with an instruction from the primary memory due to transferring the sequential instruction from the primary memory to the microprocessor.

* * * * *